United States Patent
Li

(10) Patent No.: US 9,523,345 B2
(45) Date of Patent: Dec. 20, 2016

(54) SEA WAVE POWER GENERATION DEVICE

(71) Applicant: Xiaochun Li, Guangdong (CN)

(72) Inventor: Xiaochun Li, Guangdong (CN)

(73) Assignees: Chao Liu, Shenzhen, Guangdong (CN); Waves New Energy Limited, Hong Kong (CN)

( * ) Notice: Subject to any disclaimer, the term of this patent is extended or adjusted under 35 U.S.C. 154(b) by 158 days.

(21) Appl. No.: 14/370,059

(22) PCT Filed: Mar. 28, 2013

(86) PCT No.: PCT/CN2013/073366
§ 371 (c)(1),
(2) Date: Mar. 2, 2015

(87) PCT Pub. No.: WO2013/143482
PCT Pub. Date: Oct. 3, 2013

(65) Prior Publication Data
US 2015/0176561 A1 Jun. 25, 2015

(30) Foreign Application Priority Data

Mar. 30, 2012 (CN) .......................... 2012 2 0128255
Mar. 13, 2013 (HK) ................................ 131031211

(51) Int. Cl.
*F03B 13/10* (2006.01)
*F03B 13/18* (2006.01)

(52) U.S. Cl.
CPC ............. *F03B 13/18* (2013.01); *F03B 13/186* (2013.01); *Y02E 10/38* (2013.01)

(58) Field of Classification Search
CPC ............................... F03B 13/18; F03B 13/186
(Continued)

(56) References Cited

U.S. PATENT DOCUMENTS

| 163,451 A | * | 5/1875 | Buckner | ............... F03B 13/186 290/53 |
| 285,251 A | * | 9/1883 | Forster | .................. F03B 13/186 60/502 |

(Continued)

FOREIGN PATENT DOCUMENTS

| CN | 202659408 U | * | 1/2013 | |
| FR | 643544 A | * | 9/1928 | ............ F03B 13/186 |
| FR | 2511087 A1 | * | 2/1983 | ............ F03B 13/186 |

OTHER PUBLICATIONS

Li, Jan. 2013, machine translation of CN 202659408 U document.*

*Primary Examiner* — Julio Gonzalez

(57) ABSTRACT

A sea wave power generation device includes: a motion bar, a platform, a platform-supporting upper upright post for supporting the platform, a platform-supporting lower upright post, a hydraulic lift post, a flywheel set for connecting power generation equipment, and a platform lift control device, wherein sea wave pushes floating ball to drive the motion bar to move upwards, a rack section of the motion bar drives a first flywheel on first side to rotate, which drives a generator to generate power through a spindle; wherein after the sea wave, the floating ball drives the motion bar to move downwards under action of gravity. The rack section of the motion bar drives a second flywheel on second side to rotate, which drives the generator to generate power through the spindle, in such a manner that continuous power generation is achieved.

4 Claims, 4 Drawing Sheets

(58) Field of Classification Search
USPC ...... 290/42, 53; 60/495, 498, 496, 497, 501, 60/502; 417/330, 331, 333; 405/76
See application file for complete search history.

(56) References Cited

U.S. PATENT DOCUMENTS

| | | | | |
|---|---|---|---|---|
| 1,004,332 A * | 9/1911 | Allen | ................... | F03B 13/186 60/507 |
| 1,184,362 A * | 5/1916 | Lindquist | .............. | F03B 13/187 60/501 |
| 1,393,472 A * | 10/1921 | Williams | .............. | F03B 13/262 290/42 |
| 1,482,713 A * | 2/1924 | Stein | .................... | F03B 13/262 192/103 A |
| 1,544,031 A * | 6/1925 | Polleys | .................. | F03B 13/18 60/504 |
| 1,711,103 A * | 4/1929 | Smith | ................... | F03B 13/186 74/131 |
| 1,953,285 A * | 4/1934 | Arner | ................... | F03B 13/1815 60/498 |
| 3,746,875 A * | 7/1973 | Donatelli | .............. | F03B 13/145 290/42 |
| 3,930,168 A * | 12/1975 | Tornabene | .......... | F03B 13/1845 290/53 |
| 3,964,264 A * | 6/1976 | Tornabene | ............ | F03B 13/186 175/5 |
| 4,627,240 A * | 12/1986 | Holmes | ............... | F03B 13/1845 290/53 |
| 5,929,531 A * | 7/1999 | Lagno | ................... | F03B 13/262 290/42 |
| 6,574,957 B2 * | 6/2003 | Brumfield | ........... | F03B 13/1815 60/398 |
| 7,969,033 B2 * | 6/2011 | Ryan | ....................... | F03B 17/04 290/42 |
| 2009/0072540 A1 * | 3/2009 | McCague | ............ | F03B 13/186 290/53 |

* cited by examiner

SEA WAVE POWER GENERATION DEVICE

CROSS REFERENCE OF RELATED APPLICATION

This is a U.S. National Stage under 35 U.S.C. 371 of the International Application PCT/CN2013/073366, filed Mar. 28, 2013, which claims priority under 35 U.S.C. 119(a-d) to CN 201220128255.2, filed Mar. 30, 2012, and HK131031211, filed Mar. 13, 2013.

BACKGROUND OF THE PRESENT INVENTION

Field of Invention

The present invention relates to a sea wave power generation device.

Description of Related Arts

A patent application with a publication number of CN102287311A discloses a multi-cylinder sea wave power generator comprising a generator set and a support. A spindle is provided on the rack. An end of the spindle is connected with a spindle of the generator set. The multi-cylinder sea wave power generator is characterized in that at least four pairs of flywheels are provided on the spindle. Each pair of flywheels has a floating ball provided on a bottom thereof. For each pair of flywheel, a guide rod is provided on a radial side of a first flywheel. A cogging is provided on a vertical side face of the guide rod, and the cogging is engaged with the corresponding flywheel via a supporting mechanism. A bottom of the guide rod is connected with the corresponding floating ball. A transmission mechanism capable of driving the flywheel to rotate is provided on a second flywheel. However, problems of great investment, unreasonable structures, difficult implement and etc. exist in this kind of devices.

SUMMARY OF THE PRESENT INVENTION

Accordingly, in order to overcome the shortcomings in the conventional art, the present invention provides a reasonably structured sea wave power generation device which is simple in structure and practical in utilization.

Technical solutions provided by the present invention are as follows.

A sea wave power generation device comprises:

a motion bar, which has a rack section provided on an upper portion thereof and a floating ball provided on a lower portion thereof;

a platform for installing the motion bar, wherein the motion bar moves up and down on the platform;

a platform-supporting upper upright post for supporting the platform;

a platform-supporting lower upright post, wherein a lower portion thereof is mounted on a seabed and an upper portion thereof is connected with the platform-supporting upper upright post;

a hydraulic lifting post which is connected between the platform-supporting upper upright post and the platform-supporting lower upright post, in such a manner that rising and lowering of the platform-supporting upper upright post is automatically adjusted with ebb and flow of sea wave;

a flywheel set, comprising a first flywheel and a second flywheel which are respectively mounted on two sides of the rack section of the motion bar, wherein gears of the first flywheel and the second flywheel are engaged with the rack section, and a first spindle of the first flywheel and a second spindle of the second flywheel are connected with a generator;

a platform lift control device for controlling automatic rising and lowering of the hydraulic lifting post, so as to ensure that the floating ball moves up and down between high and low positions of the sea wave, wherein the sea wave pushes the floating ball to drive the motion bar to move upwards, the rack section of the motion bar drives the first flywheel on a first side to rotate, and the first flywheel drives the generator to generate power through the first spindle; wherein after the sea wave, the floating ball drives the motion bar to move downwards under an action of gravity, the rack section of the motion bar drives the second flywheel on a second side to rotate, and the second flywheel drives the generator to generate power through the second spindle, in such a manner that a continuous power generation is achieved.

Further, a surface of the platform has a motion hole, and a motion-bar sleeve is provided under the platform, the motion-bar hole is inter-communicated with the motion-bar sleeve, wherein the motion-bar sleeve is fixed together with the platform-supporting upper upright post via a fixing support, the motion bar moves up and down in the motion-bar hole and the motion-bar sleeve, and wherein the rack section on the upper portion of the motion bar is situated above the platform, and the floating ball on the lower portion of the motion bar is situated below the platform.

Preferably, in the platform lift control device, a high contact and a low contact are provided on the motion bar, a high location switch and a low location switch are provided on the motion-bar sleeve, wherein the high location switch and the low location switch are connected with a lift cylinder of the hydraulic lifting post via a solenoid valve, wherein when the motion bar moves to a high position, the high location switch closes the solenoid valve, in such a manner that an oil pump of the lift cylinder starts to work and the lift cylinder pushes the hydraulic lifting post to lift up the platform; and when the motion bar moves to a low position, the low location switch closes the solenoid valve, in such a manner that the oil pump of the lift cylinder starts to work and the lift cylinder pulls the hydraulic lifting post to lower down the platform.

Preferably, the flywheel set comprises a ratchet and the gear, and a pawl is provided between the ratchet and the gears.

Preferably, the platform lift control device further comprises a storage battery and an auxiliary power generation assembly, solar energy and wind energy for instance, so as to charge the storage battery.

Beneficial effects of the present invention are as follows. The sea wave power generation device takes full advantage of sea wave to generate power, has a simple structure, a low cost and a high efficiency. Furthermore, a plurality of the sea wave power generation devices is capable of being installed simultaneously for working.

These and other objectives, features, and advantages of the present invention will become apparent from the following detailed description, the accompanying drawings, and the appended claims.

In the FIGS. 1~4, 1—rack section; 2—a first flywheel; 3—a second flywheel; 31—gear; 32—ratchet; 33—spring; 34—pawl; 4—spindle; 5—motion-bar hole; 6—motion bar; 7—platform; 8—platform-supporting upper upright post; 9—motion-bar sleeve; 10—fixing support; 11—hydraulic lifting post; 12—platform-supporting lower upright post; 13—floating ball; 14—sea wave; 15—high contact; 16—low contact.

DETAILED DESCRIPTION OF THE PREFERRED EMBODIMENT

Combining with the accompanying drawings, the preferred embodiment of the present invention is further illustrated as follows.

Figure 1:
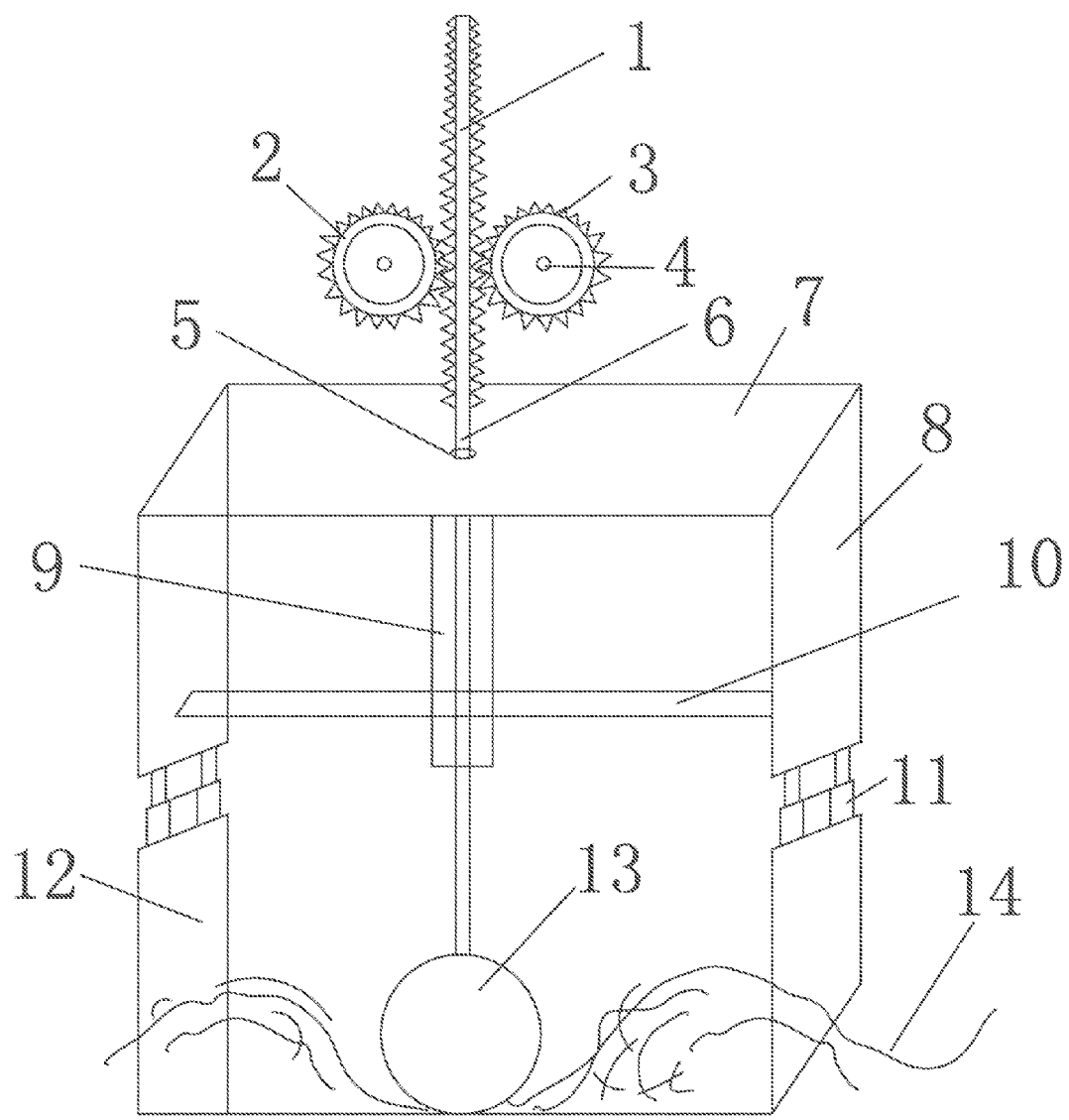
FIG. 1 is an overall structural view of a sea wave power generation device according to a preferred embodiment of the present invention.
Figure 2:
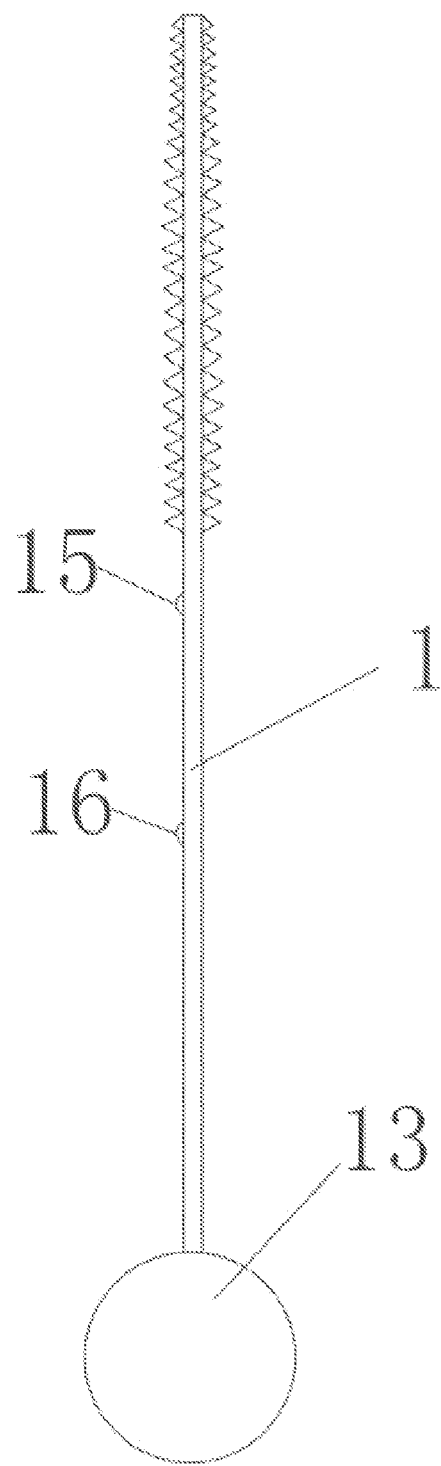
FIG. 2 is a sketch view of a motion bar of FIG. 1.
Figure 3:
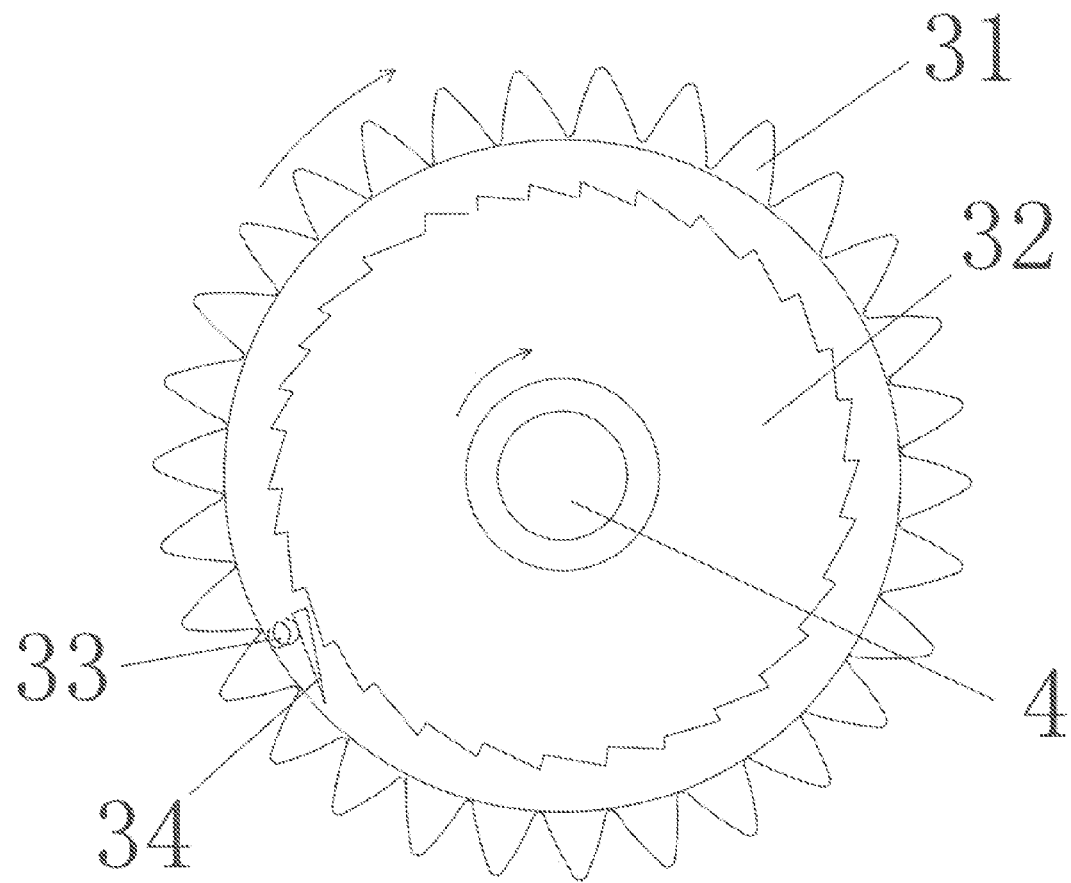
FIG. 3 is a sketch view of a flywheel of FIG. 1.

Referring to FIG. 1 of the drawings, a sea wave power generation device according to a preferred embodiment of the present invention generates power by utilizing up-and-down height difference of a sea wave 14, wherein the sea wave power generation device comprises a motion bar 6, a platform 7, two platform-supporting upper upright posts 8, two platform-supporting lower upright posts 12, two hydraulic lifting post 11, a first flywheel 2, a second flywheel 3, a floating ball 13 and a platform lift control device (not shown in the Figs).

The motion bar 6 has a rack section 1 provided on an upper portion thereof and the floating ball 13 provided on a lower portion thereof. A high contact 15 and a low contact 16 are provided on the motion bar 6.

The platform 7 has a motion-bar hole 5. Correspondingly, a motion-bar sleeve 9 is provided below the motion-bar hole 5. The two platform-supporting upper upright posts 8 are respectively connected with two ends of the platform 7. The motion bar sleeve 9 is mounted on the two platform-supporting upper upright posts 8 via a fixing support 10. The two platform-supporting upper upright posts 8 are respectively connected with the two platform-supporting lower upright posts 12 via the two hydraulic lifting posts 11. The two platform-supporting lower upright posts 12 are supported on a surface of a seabed. The hydraulic lifting posts 11 are controlled by the platform lift control device.

The first flywheel 2 and the second flywheel 3 respectively comprise a gear 31, a ratchet 32, a spring 33 and a pawl 34, wherein a structure thereof is analogous to a flywheel of a bicycle.

The motion bar 6 goes through the motion-bar hole 5 and the motion-bar sleeve 9. The floating ball 13 is contacted with the sea wave. The first flywheel 2 and the second flywheel 3 are respectively provided on two sides of the rack section 1. Gears 31 of the first flywheel 2 and the second flywheel 3 are engaged with the rack section 1, and spindles 4 of the first flywheel 2 and the second flywheel 3 are respectively connected with a generator set (not shown in the Figs.). Under an effect of the sea wave 14, the floating ball 13 drives the motion bar 6 to move upwards, the rack section 1 of the motion bar 6 drives the second flywheel 3 on a second side to rotate, and the second flywheel 3 drives the generator set to generate power through the spindle 4. After the sea wave 14 passes, the floating ball 13 drives the motion bar 6 to move downwards under an action of gravity, the rack section 1 of the motion bar 6 drives the first flywheel 2 on a first side to rotate, and the first flywheel 2 drives the generator set to generate power through the spindle 4, in such a manner that a continuous power generation is achieved.

The platform lift control device comprises a lift cylinder, an oil pump, a storage battery, a solenoid valve, a high location switch, a low location switch and a control circuit. The lift cylinder is connected between the platform-supporting upper upright post 8 and the platform-supporting lower upright post 12. The high location switch and the low location switch are provided on the motion-bar sleeve 9. The high location switch and the low location switch are connected with the lift cylinder of the hydraulic lifting post 11 via the storage battery and the solenoid valve. When the motion bar 6 moves to a high position, the high contact 15 actuates the high location switch, and the high location switch closes the solenoid valve, in such a manner that the oil pump of the lift cylinder starts to work and the lift cylinder pushes the hydraulic lifting post 11 to lift up the platform 7. When the motion bar 6 moves to a low position, the low contact 16 actuates the low location switch, and the low location switch closes the solenoid valve, in such a manner that the oil pump of the lift cylinder starts to work and the lift cylinder pulls the hydraulic lifting post to lower down the platform. Thus, the platform 7 is capable of automatically regulating lift and fall with ebb and flow of the sea wave, so as to meet requirements that the floating ball 13 moves up and down between the high position and the low position of the sea wave to work properly.

The storage battery is capable of meeting power requirements for lighting and operation of the oil pump.

Figure 4:
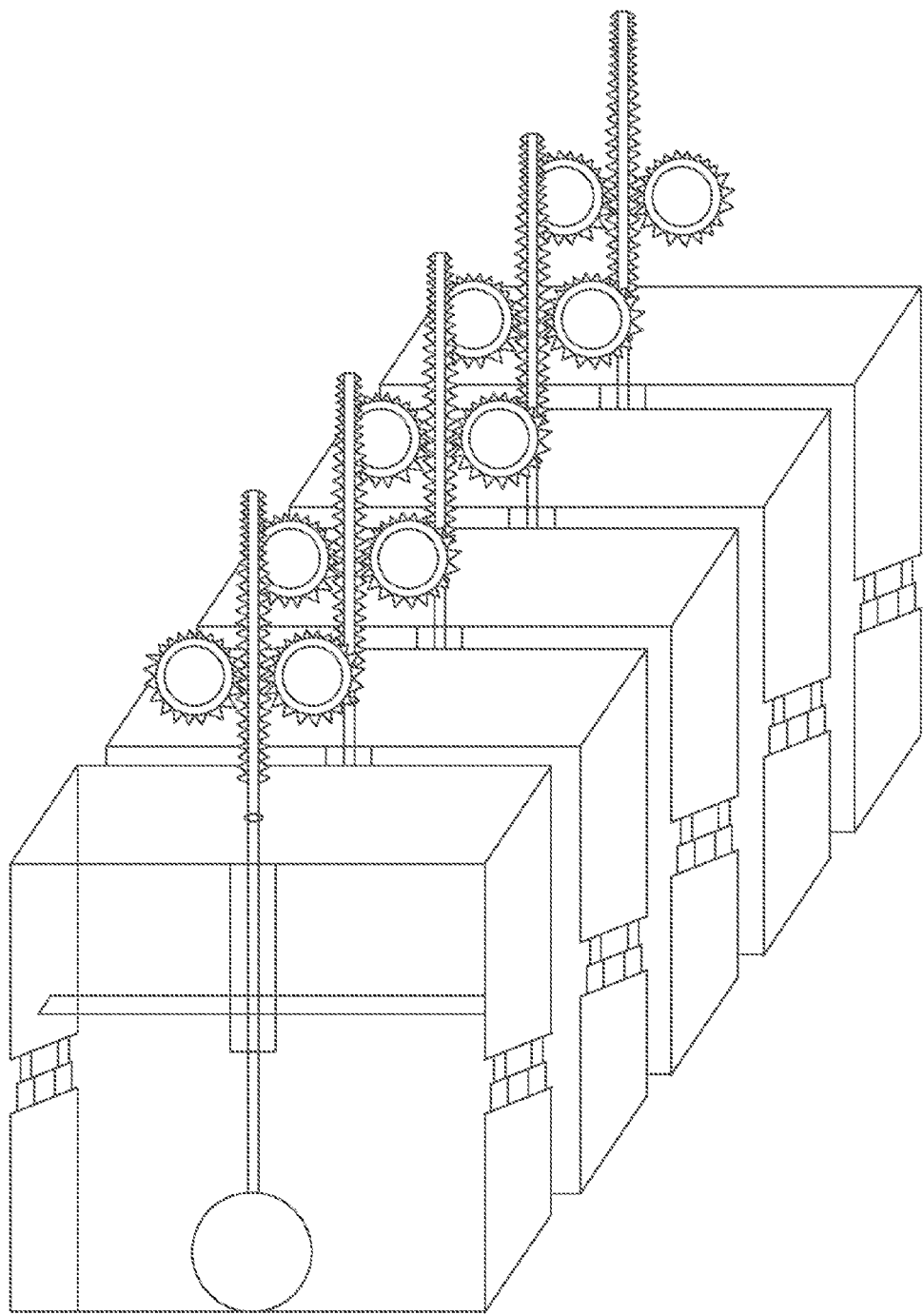
FIG. 4 is an operation sketch view of an arrangement state of a plurality of sea wave power generation devices of the present invention.

As showed in FIG. 4, a plurality of the sea wave power generation devices are arranged to operate for power generation.

Working Principle

It is well known that both the sea wave and the sea swell has characteristics of moving up and down. Sometimes the rising height of the sea wave or the sea swell reaches several meters, and when the sea wave or the sea swell passes, the height thereof drops to a height identical to the height of the sea level, which continuously recycles. When a first sea wave comes, the peak of the first sea wave pushes a first floating ball, and then pushes a second, third, fourth and etc. floating balls. While the sea wave or the sea swell pushes the floating balls, the floating balls drive the motion bar to move upwards, in such a manner that the first flywheel rotates clockwise and the second flywheel rotates counterclockwise. The first flywheel rotating clockwise drives the first spindle to rotate, so as to drive the generator set to operate. However, since the second flywheel rotates counterclockwise, the second spindle does not rotate. When the sea wave crosses over the first floating ball, the first floating ball drops with the sea wave, and the weight of the first floating ball pulls the motion bar to move downward. At this moment, the second flywheel which rotates counterclockwise begins to rotate clockwise, in such a manner that the spindle rotates, so as to drive the generator set to operate. When the sea wave or the sea swell passes the first floating ball and reach the second floating ball, the second floating ball repeats the movements identical to the first floating ball mentioned above. The process recycles continuously and provides constant motive force for power generation.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sea wave power generation device, comprising:
   a motion bar, which has a rack section provided on an upper portion thereof and a floating ball provided on a lower portion thereof;
   a platform for installing the motion bar, wherein the motion bar moves up and down on the platform;
   a platform-supporting upper upright post for supporting the platform;
   a platform-supporting lower upright post, wherein a lower portion thereof is mounted on a seabed and an upper portion thereof is connected with the platform-supporting upper upright post;
   a hydraulic lifting post which is connected between the platform-supporting upper upright post and the platform-supporting lower upright post, in such a manner that rising and lowering of the platform-supporting upper upright post is automatically adjusted with ebb and flow of a sea wave;
   a flywheel set, comprising a first flywheel and a second flywheel which are respectively mounted on two sides of the rack section of the motion bar, wherein gears of the first flywheel and the second flywheel are engaged with the rack section, and a first spindle of the first flywheel and a second spindle the second flywheel are for connecting with a generator;
   a platform lift control device for controlling automatic rising and lowering of the hydraulic lifting post, so as to ensure that the floating ball moves up and down between high and low positions of the sea wave, wherein sea wave pushes the floating ball to drive the motion bar to move upwards, the rack section of the motion bar drives the first flywheel on a first side to rotate, and the first flywheel is for driving the generator to generate power through the first spindle; wherein after the sea wave, the floating ball drives the motion bar to move downwards under an action of gravity, the rack section of the motion bar drives the second flywheel on a second side to rotate, and the second flywheel is for driving the generator to generate power through the second spindle, in such a manner that continuous power generation is achieved.

2. The sea wave power generation device, as recited in claim 1, wherein a surface of the platform has a motion-bar hole, and a motion-bar sleeve is provided under the platform, the motion-bar hole is inter-communicated with the motion-bar sleeve,
   wherein the motion-bar sleeve is fixed together with the platform-supporting upper upright post via a fixing support, the motion bar moves up and down in the motion-bar hole and the motion-bar sleeve, and
   wherein the rack section on the upper portion of the motion bar is situated above the platform, and the floating ball is situated on the lower portion of the motion bar and below the platform.

3. The sea wave power generation device, as recited in claim 1, wherein in the platform lift control device, a high contact and a low contact are provided on the motion bar, a high location switch and a low location switch are provided on the motion-bar sleeve,
   wherein the high location switch is connected with a lift cylinder of the hydraulic lifting post via a solenoid valve,
   when the motion bar moves to a low position, the low location switch closes the solenoid valve, in such a manner that the oil pump of the lift cylinder starts to work and the lift cylinder pulls the hydraulic lifting post to lower down the platform.

4. The sea wave power generation device, as recite in claim 1, wherein the flywheel set comprises a ratchet and a gear, and a pawl is provided between the ratchet and the gears.

* * * * *